United States Patent
Despesse et al.

(10) Patent No.: US 11,658,485 B2
(45) Date of Patent: May 23, 2023

(54) ELECTRICAL SYSTEM COMPRISING SWITCHED CELLS AND METHOD FOR CONTROLLING SUCH A SYSTEM

(71) Applicant: Commissariat à l'Énergie Atomique et aux Énergies Alternatives, Paris (FR)

(72) Inventors: Ghislain Despesse, Grenoble (FR); Sylvain Bacquet, Grenoble (FR); Léandro Cassarino, Grenoble (FR); Eric Fernandez, Grenoble (FR); Yan Lopez, Grenoble (FR); Rémy Thomas, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 99 days.

(21) Appl. No.: 16/972,135

(22) PCT Filed: Jun. 4, 2019

(86) PCT No.: PCT/FR2019/051326
§ 371 (c)(1),
(2) Date: Dec. 4, 2020

(87) PCT Pub. No.: WO2019/234348
PCT Pub. Date: Dec. 12, 2019

(65) Prior Publication Data
US 2021/0249873 A1 Aug. 12, 2021

(30) Foreign Application Priority Data

Jun. 6, 2018 (FR) ...................................... 1800573

(51) Int. Cl.
*H02J 7/00* (2006.01)
*H02J 3/32* (2006.01)
(Continued)

(52) U.S. Cl.
CPC ................ *H02J 3/32* (2013.01); *H02J 7/005* (2020.01); *H02J 7/0014* (2013.01);
(Continued)

(58) Field of Classification Search
CPC ....................................................... H02J 7/0024
See application file for complete search history.

(56) References Cited

U.S. PATENT DOCUMENTS 5,656,915 A * 8/1997 Eaves ................... H02J 7/0024
320/120
8,587,907 B2 11/2013 Gaben
(Continued)

FOREIGN PATENT DOCUMENTS

EP 2 993 483 A1 3/2016
GB 2 537 616 A 10/2016

OTHER PUBLICATIONS

International Search Report and Written Opinion for International Application No. PCT/FR2019/051326, dated Sep. 16, 2019.
(Continued)

*Primary Examiner* — Robert Grant
(74) *Attorney, Agent, or Firm* — Wolf, Greenfield & Sacks, P.C.

(57) ABSTRACT

A method of controlling an electric system including electric cells. The method includes the steps of: a) determining a first (second) priority table including first (second) cell priority levels for a system charge (discharge) operation; b) determining the average current exchanged by each cell over a time window according to the cell implementation number in a cell connection sequence; c) determining a classification of the cell implementation numbers by increasing or decreasing order of the average current; d) assigning the implementation numbers according to the order of the classification to the cells by increasing or decreasing number
(Continued)

of the priority levels of the first or second priority table; and
e) connecting or disconnecting the cells according to the order of the assigned implementation numbers.

15 Claims, 7 Drawing Sheets

(52) U.S. Cl.
CPC .......... *H02J 7/0024* (2013.01); *H02J 7/0048* (2020.01); *H02J 7/0068* (2013.01)

(56) References Cited

U.S. PATENT DOCUMENTS

| | | |
|---|---|---|
| 9,673,431 B2 | 6/2017 | Despesse |
| 10,044,069 B2 | 8/2018 | Despesse |
| 2012/0070701 A1 | 3/2012 | Gaben |
| 2012/0091967 A1 | 4/2012 | Kawamoto et al. |
| 2013/0009485 A1 | 1/2013 | Sakuma et al. |
| 2013/0278216 A1 | 10/2013 | Son et al. |
| 2014/0077595 A1 | 3/2014 | Kakuya et al. |

OTHER PUBLICATIONS

International Preliminary Report on Patentability for International Application No. PCT/FR2019/051326, dated Dec. 17, 2020.
PCT/FR2019/051326, Sep. 16, 2019, International Search Report and Written Opinion.
PCT/FR2019/051326, Dec. 17, 2020, International Preliminary Report on Patentability.

\* cited by examiner

ELECTRICAL SYSTEM COMPRISING SWITCHED CELLS AND METHOD FOR CONTROLLING SUCH A SYSTEM

This application is a national stage filing under 35 U.S.C. § 371 of International Patent Application Serial No. PCT/FR2019/051326, filed Jun. 4, 2019, which claims priority to French patent application FR18/00573, filed on Jun. 6, 2018. The contents of these applications are incorporated herein by reference in their entirety.

BACKGROUND

The present invention concerns a system with switched cells and a method of controlling such a system.

DISCUSSION OF THE RELATED ART

A system with switched cells comprises a plurality of stages or modules in each of which cells may be connected in series and/or in parallel by controllable switches. An example of a system with switched cells corresponds to a battery of electric accumulators, also called battery pack. Examples of batteries with switched electric accumulators are particularly described in documents US2014015488, US2014287278, FR2972308, FR2972307, and US2014109950.

A system with switched cells is capable of delivering a voltage having a time-variable waveform by varying over time the connection of the cells via the turning on or the turning off of the switches.

It is desirable for the selection of the cells to be connected/disconnected to be performed by ensuring that each cell operates in its optimal operating range according, for example, to voltage, current, and/or temperature measurements. In particular, it may be desirable to perform a balancing of the cells, that is, to select the cells to be connected/disconnected so that all cells reach their end of charge or their end of discharge substantially at the same time.

To perform the balancing function, a classification of the cells according to priority levels, called priority table hereafter, is generally determined, the cells with the highest priority in the classification being those which should be selected first, the cells having a lower and lower priority as the priority level in the classification increases. The priority classification is likely to vary during the system operation, particularly due to the variation of the states of charge of the cells. Two priority tables may be used, the first table, called discharge priority table hereafter, being used during a cell discharge operation and the second table, called charge priority table hereafter, being used during a cell charge operation. As an example, during a discharge operation, the cells with the highest priority are those which are the more strongly charged and the cells with the lowest priority are the more lightly charged and, during a charge operation, the cells with the highest priority are those which are the more lightly charged and the cells with the lowest priority are the more strongly charged.

Figure 1:
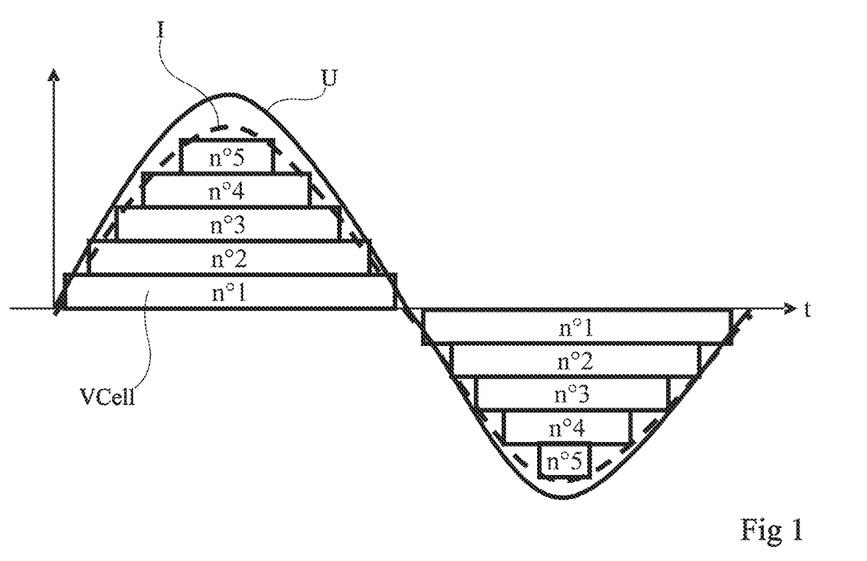
FIG. 1 shows an example of curves of the variation of a voltage and of a current to be delivered by a known system and the cells which are connected to follow the voltage set point.

FIG. 1 shows an example of a curve of variation of a periodic or pseudo-periodic voltage U and current I to be delivered by a system with switched cells, for example comprising five cells capable of being series-connected. The voltage U to be delivered is sinusoidal and the current I to be delivered is in phase with voltage U. The instantaneous power exchanged by the system is equal to the product of voltage U and of current I. As an example, a positive instantaneous power means the delivery of electric power by the system to the outside and a negative instantaneous power means the absorption by the system of electric power originating from the outside. The cells are connected and disconnected along the variation of voltage U so that the voltage delivered by the system follows voltage U. In the example shown in FIG. 1, the electric power is always positive.

FIG. 1 schematically shows with rectangles Vcell the voltages delivered by each connected cell, each rectangle containing the priority level of the connected cell, the cell with the highest priority having number 1 and the cell with the lowest priority having number 5. The voltage really delivered by the system corresponds to the sum of the elementary voltages of the connected cells. The selection of the cells to be connected may comprise using the charge priority table when the system is charging or the discharge priority table when the system is discharging and connecting the cells according to the increasing priority levels of the classification used.

In the example of FIG. 1, the instantaneous power has the same sign over a period of voltage U. However, for certain applications, the system may power a load having a reactive component such that the instantaneous power supplied by the system may change sign a plurality of times over the period of voltage set point U.

Figure 2:
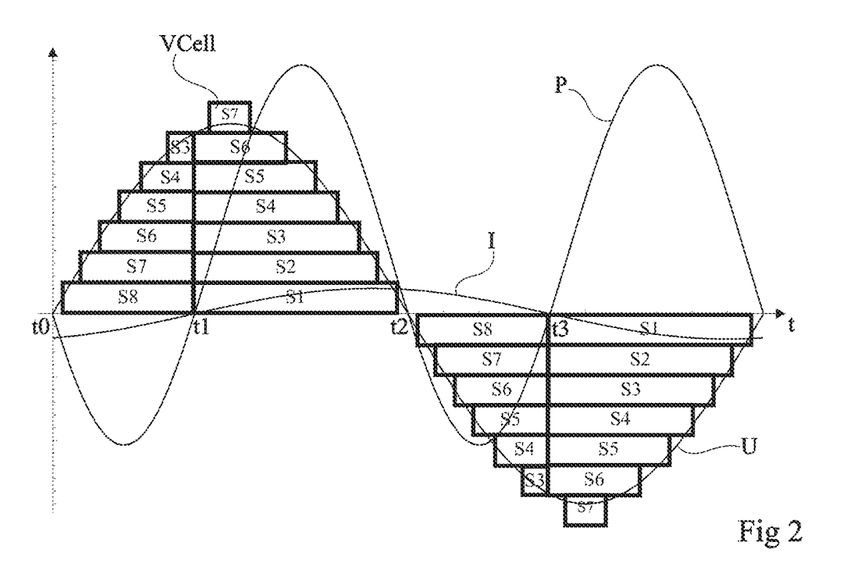
FIG. 2 is a view similar to FIG. 1 for another example of curves of variation of the voltage and of the current to be delivered by the known system and further shows the curve of variation of the instantaneous power to be delivered by the switched cell system.

FIG. 2 is a drawing similar to FIG. 1 for a system comprising 8 cells capable of being series-connected and in the case where current I is phase-shifted with respect to voltage U. FIG. 2 further shows curve P of the variation of the instantaneous power exchanged by the system. Power P changes sign four times over the period of voltage U at times t0, t1, t2, and t3. FIG. 2 schematically shows with rectangles VCell the voltages delivered by each connected cell, each rectangle containing a reference of the state of charge of the cell, the most strongly charged cell bearing reference S1 and the less strongly charged cell bearing reference S8.

From time t0 to time t1, the instantaneous power is negative so that the system is charging. The selection of the cells to be connected is performed by using the charge priority table. Thus, the most lightly charged cell having reference S8 is charged first. At time t1, the sign of the instantaneous power changes while the voltage is not null. The system then passes from a charge operation to a discharge operation. If the discharge priority table is then desired to be used, as shown in FIG. 2, the number of cells to be disconnected and to be connected is significant. It may however be difficult for the system to rapidly perform a significant number of connections and disconnections. It may then not be possible to properly follow voltage U. However, if the charge priority table keeps on being used after time t1, certain connected cells which have been submitted to a charge phase between t0 and t1 may not hold the priority for a discharge operation, such as cell S8. The risk then is for cells to be too strongly discharged, since the discharge phase between t1 and t2 is longer than the charge phase, between t0 and t1, as could be the case for cell S8 if the charge priority table keeps on being used after time t1. As a variant, since the average power is positive, that is, the system is generally discharging, it would be rather advantageous to continuously use the discharge priority table. However, the average current applied to each cell would not for all this necessarily follow the decreasing order of the discharge priority table, for example, S1 could see a discharge current smaller than S7, S7 being only used in positive power while S1 is submitted to an alternation of negative and positive power with an effectively longer connection duration but with an average current which is not necessarily higher for all this.

SUMMARY

Thus, an object of an embodiment is to provide a battery which overcomes at least some of the disadvantages of the previously-described systems with switched cells.

Another object is to ease the balancing of the cells.

Another object is for the selection of the cells to be connected to take into account the sign changes of the instantaneous power delivered by the system.

Another object is for the number of simultaneously connected cells to be decreased, preferably equal to one.

Thus, an embodiment provides a method of controlling an electric system comprising first and second terminals, electric cells, and switches configured to connect or disconnect the cells in series and/or in parallel between the first and second terminals, the method comprising the steps of:

a) determining a first priority table comprising first cell priority levels for a system charge operation and a second priority table comprising second cell priority levels for a system discharge operation;

b) determining data representative of the average current or of the average electric power exchanged by each cell over a time window according to the cell implementation number in a cell connection sequence;

c) determining a classification of at least part of the cell implementation numbers by increasing or decreasing order of the data representative of the average current or of the average electric power;

d) assigning the implementation numbers according to the classification order to the cells by increasing or decreasing order of the priority levels of at least one of the first or second priority tables; and e) controlling the switches to connect or disconnect the cells according to the order of the assigned implementation numbers.

According to an embodiment, the method further comprises, at step e), the receiving by the system of a new set point and the control of the switches to connect the cells according the order of the assigned implementation numbers.

According to an embodiment, at step c), all the cell implementation numbers are classified by increasing or decreasing order of the data and, at step d), all the implementation numbers are assigned to the cells by increasing or decreasing order of the priority levels of one of the first or second priority tables.

According to an embodiment, the data may have a first sign or a second sign opposite to the first sign, the method comprising, at step c), determining a first classification of the cell implementation numbers by increasing or decreasing order of the data of the first sign and determining a second classification of the cell implementation numbers by increasing or decreasing order of the data of the second sign, the method further comprising, at step d), assigning the implementation numbers according to the order of the first classification to the cells by increasing or decreasing order of the priority levels of the first priority table and assigning the implementation numbers according to the order of the second classification to the cells by increasing or decreasing order of the priority levels of the second priority table.

According to an embodiment, the cells are disconnected according to one of at least two disconnection rules, wherein steps b) and c) are carried out for each disconnection rule, the method comprising, for the implementation of step d), selecting a first classification obtained with the first disconnection rule or a second classification obtained with the second disconnection rule according to the comparison of the data of the first and second classifications with desired data.

According to an embodiment, the first disconnection rule is that the first cell to be connected is the last cell to be disconnected and the second disconnection rule is that the first cell to be connected is the first cell to be disconnected.

According to an embodiment, the time window is shorter than 500 ms.

According to an embodiment, the set point is selected from the group comprising a set point for the delivery of a voltage between the first and second terminals, a set point for the delivering of a current to the first terminal, or a set point for the number of electric cells.

According to an embodiment, the first priority table is used during the absorption by the system of electric energy originating from the outside and the second priority table is used during the delivery of electric energy by the system to the outside.

According to an embodiment, the method comprising passing from the use of the first priority table to the second priority table when the system passes from the absorption of electric energy originating from the outside to the delivery of electric energy to the outside and passing from the use of the second priority table to the first priority table when the system passes from the delivery of electric energy to the outside to the absorption of electric energy originating from the outside.

An embodiment also provides an electric system comprising first and second terminals, electric cells, switches configured to connect or disconnect the cells in series and/or in parallel between the first and second terminals, and a processing module configured to:

a) determine a first priority table comprising first cell priority levels for a system charge operation and a second priority table comprising second cell priority levels for a system discharge operation;

b) determine data representative of the average current or of the average electric power exchanged by each cell over a time window according to the cell implementation number in a cell connection sequence;

c) classify at least part of the cell implementation numbers by increasing or decreasing order of the data representative of the average current or of the average electric power;

d) assign implementation numbers according to the classification order to the cells by increasing or decreasing order of the priority levels of at least one of the priority tables; and e) control the switches to connect or disconnect the cells according to the order of the assigned implementation numbers.

According to an embodiment, the cells are electric charge storage elements and/or electric generators.

According to an embodiment, the cells are electric accumulators.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. For the sake of clarity, only the elements that are useful for an understanding of the embodiments described herein have been illustrated and described in detail. In the following description, the expressions "approximately", "substantially", and "in the order of" signify within 10%, preferably within 5%.

An embodiment of a method of controlling systems with switched cells will be described in the case of a switched accumulator battery for which the cells correspond to switched accumulators. However, the present embodiments apply to any type of switched-cell system capable of delivering a variable voltage to a load. Each cell of the system with switched cells may correspond to an electric charge storage element or to an electric generator. An example of an electric charge storage element for example is an electric accumulator or a capacitor. An example of an electric generator is for example a fuel cell, a zinc-air cell, a photovoltaic cell, or an energy harvesting system, particularly a small wind power plant or a mini-turbine. The system witch switched cells may comprise electric charge storage elements only, electric generators only, or both electric charge storage elements and electric generators. When the system with switched cells comprises electric generators only, the use is theoretically in discharge mode only. However, in case of a reactive power, for brief passages through a negative power at each period, the inertia of the generator may be sufficient to smooth the power, for example, due to the rotation inertia and to the stray capacitances. Further, each generator may be connected in parallel to a resistive or inductive element, to accept negative powers, by dissipating this energy. In operation, the system is intended to be coupled to a device which absorbs or supplies power according to the envisaged application. As an example, this device corresponds to an electric machine, for example, to an electric motor, or to the electric distribution network.

Figure 3:
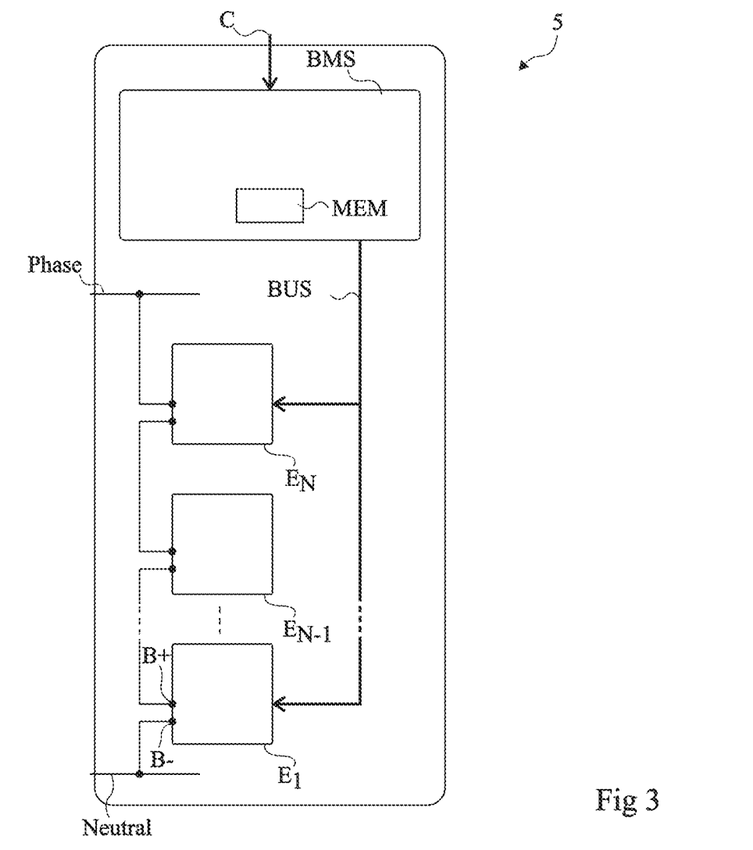
FIG. 3 partially and schematically shows an embodiment of a switched accumulator battery.

FIG. 3 shows an example of a battery 5 with switched accumulators. Battery 5 comprises N modules $E_1$ to $E_N$. Number N is an integer greater than or equal to 1, preferably number N is in the range from 1 to 100,000. Each module comprises a positive terminal B+ and a negative terminal B− and a plurality of cells, not shown, connectable in series and/or in parallel via switches, not shown, between terminals B+ and B−. Modules $E_1$ to $E_N$ may be series-connected between a first terminal N of battery 5 and a second terminal P of battery 5.

Battery 5 comprises a circuit BMS for controlling modules $E_1$ to $E_N$, called master control circuit hereafter. Master control circuit BMS may exchange data with each module $E_1$ to $E_N$ over a bidirectional data transmission BUS. Each module $E_1$ to $E_N$ comprises a circuit capable of controlling the switches of the module based on the control signals supplied by master control circuit BMS. This control circuit is called slave control circuit hereafter. Each module may further comprise sensors, not shown, for example, sensors of the voltage across each cell of the module, sensors of the current delivered by each cell of the module, and/or sensors of the temperature of each cell of the module. The slave control circuit of each module $E_1$ to $E_N$ is capable of transmitting to master control circuit BMS data representative of the voltage, current, and/or temperature measurements over data transmission bus BUS.

Master control circuit BMS may comprise a sensor of the voltage between terminals P and N as well as a general current sensor and one or a plurality of temperature sensors. Master control circuit BMS is capable of receiving a set point value C and of selecting the cells to be connected or disconnected for each module in order to follow the set point value. Set point C may be a voltage or current set point, the cells to be connected or to be disconnected for each module then being selected to obtain the desired voltage and/or current between terminals P and N of battery 5. As a variant, set point C may be a set point for the number of accumulators to be connected in series and/or in parallel between terminals P and N of battery 5, the cells to be connected or to be disconnected for each module then being selected to obtain the number of accumulators connected in series and/or in parallel between terminals P and N of battery 5 requested by the set point. Master control circuit BMS then delivers control signals to the modules via data transmission bus BUS, based on which the slave control circuit of each module connects or disconnects the cells according to the desired configuration.

Master control circuit BMS may correspond to a dedicated circuit and/or may comprise a processor, for example, a microprocessor or a microcontroller, capable of executing instructions of a computer program stored in a memory. Master control circuit BMS particularly comprises a data storage memory MEM.

Figure 4:
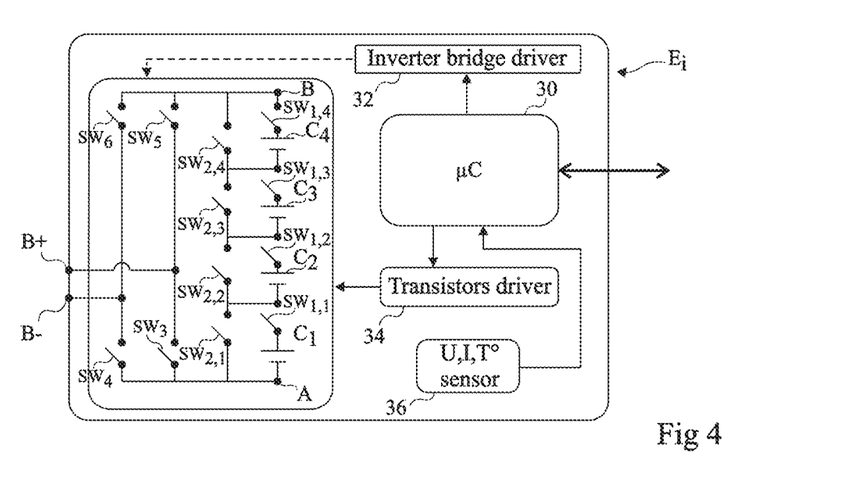
FIG. 4 partially and schematically shows an embodiment of a module of the battery of FIG. 2.

FIG. 4 shows an embodiment of module $E_i$, where i varies from 1 to N.

According to the present embodiment, module $E_i$ is capable of delivering a voltage $U_i$ between positive terminal B+ and negative terminal B−. Module $E_i$ comprises cells $C_1$ to $C_M$, where M is an integer greater than or equal to 2. For example, M is in the range from 2 to 15, preferably from 2 to 5, four cells $C_1$, $C_2$, $C_3$, and $C_4$ being shown as an example in FIG. 3. Cells $C_1$ to $C_M$ are coupled together and to terminals B+ and B− by switches. In the present embodiment, for each cell $C_k$, k being an integer in the range from 1 to M, module $E_i$ comprises a first switch $SW_{1,k}$ in series with cell $C_k$ and a second switch $SW_{2,k}$ in parallel with the assembly comprising $C_k$ and switch $SW_{1,k}$. Thus, each cell is associated with a switch in series and has a switch arranged in parallel. The M cells comprising cell $C_k$ and first switch $SW_{1,k}$ are arranged in series between a node A and a node B. The control of switches $SW_{1,k}$ and $SW_{2,k}$, with k varying from 1 to M, enables to serialize, between nodes A and B, from 1 to M cells among the M cells $C_1$ to $C_M$. In the present embodiment, module $E_i$ further comprises an inverter bridge, also called H bridge, between nodes A and B and terminals B+ and B−, which enables to apply the voltage present between nodes A and B between terminals B+ and B− in both directions. According to an embodiment, the inverter bridge comprises a switch $SW_3$ coupling node A to terminal B+, a switch $SW_4$ coupling node A to terminal B−, a switch $SW_5$ coupling node B to terminal B+, and a switch $SW_6$ coupling node B to terminal B−. As an example, each switch $SW_{1,k}$ and $SW_{2,k}$, with k varying from 1 to M, $SW_3$, $SW_4$, $SW_5$, and $SW_6$ may correspond to an insulated field-effect transistor, also called MOS transistor, particularly a MOS power transistor, for example, an N-channel MOS transistor.

Each module $E_1$ further comprises slave control circuit 30 (μC), capable of exchanging and of receiving data transmitted by master control circuit BMS over data transmission bus BUS. Slave control circuit 30 may correspond to a dedicated circuit or may comprise a processor, for example, a microprocessor or a microcontroller, capable of executing instructions of a computer program stored in a memory.

Each module $E_1$ further comprises a driver circuit 32 (Inverter bridge driver) coupled to switches $SW_3$, $SW_4$, $SW_5$, and $SW_6$ of the inverter bridge and a driver circuit 34 (Transistors driver) coupled to switches $SW_{1,k}$ and $SW_{2,k}$, with k varying from 1 to M. Each driver circuit 32, 34 is capable of converting the control signals delivered by slave control circuit 30 into signals capable of controlling the switches.

Each module $E_i$ further comprises sensors 36 (U, I, T° sensor) coupled to slave control circuit 30. Module $E_i$ may comprise, for each cell $C_k$, a temperature sensor capable of measuring the temperature of cell $C_k$. Module $E_1$ may further comprise, for each cell $C_k$, a voltage sensor capable of measuring the voltage across cell $C_k$. Module $E_i$ may further comprise a current sensor capable of measuring the current flowing at node A or at node B. The slave control circuit 30 of each module $E_i$ is capable of transmitting third data to master control circuit BMS over data transmission bus BUS, representative of the measurements performed by the sensors 36 of module $E_i$. The number and the type of sensors particularly depend on the arrangement of the cells of module $E_i$. In the cell arrangement shown in FIG. 3, a single sensor of the current flowing from node A to node B, or no current sensor at all, may be provided, and the current measurement may also be performed at any point of the power path, for example via a dedicated circuit on master control circuit BMS.

In the embodiment of a battery module $E_i$ illustrated in FIG. 4, an order to connect a cell $C_k$ of a module $E_i$ means that cell $C_k$ is to be series-connected between the nodes A and B of module $E_i$, which is obtained by turning on switch $SW_{1,k}$ and by turning off switch $SW_{2,k}$, and an order to disconnect a cell $C_k$ of a module $E_i$ means that cell $C_k$ should not be series-connected between the nodes A and B of module $E_i$, which is obtained by turning off switch $SW_{1,k}$ and by turning on $SW_{2,k}$. However, for a different arrangement of the cells $C_k$ of module $E_i$ where cells $C_k$ may be arranged in series or in parallel between nodes A and B, an order to connect cells $C_k$ further specifies in which configuration, series or parallel, cell $C_k$ is placed with respect to the other cells of module $E_i$.

The order to disconnect the already connected cells may be performed automatically by following a disconnection rule. An example of a disconnection rule is that the last connected cell is the first one to be disconnected, this rule being called FILO (First In Last Out) rule hereafter. However, another disconnection rule may be used. As an example, the connection rule may be that the first connected cell is the first one to be disconnected, this rule being called FIFO (First In First Out) rule hereafter.

According to an embodiment, the voltage and the current to be delivered by the switched cell system are continuous, periodic, or substantially periodic, which results in delivering a continuous, periodic, or substantially periodic power. This means that a period T may be defined for the voltage and the current for which the curves of variation of the current and of the voltage vary little from one period to the next one. As an example, the variation from one period to the other of the voltage/current curves can be measured with the mean squared error, calculated over a period. It can be defined that a voltage/a current varies 'little' from one period to the other if the mean squared error, between one period and the next one, is smaller than 20%. The mean squared error (MSE) being calculated, for example, for voltage curve U, between period $T_0$ and the next period $T_1$ according to the following relation 1):

$$MSE(U_{T1-T0}) = \frac{1}{n}\sum_{i=1}^{n}(U_{T1_i} - U_{T0_i})^2 \qquad 1)$$

In certain cases, such a small variation may simply translate as a sequence of durations between zero crossings of the voltage or of the current which does not change by more than 20% from one period to the other, the same applying for the peak amplitude reached between each zero crossing (or the rms value).

It should be noted that this criterion may exceptionally not be respected, but that it is preferably respected in average at least 8 times out of 10 in the sequence of periods. There may for example be unforeseeable and abrupt variations of the current on connection/disconnection of a load, the presence of non-periodic disturbances when the battery is connected to the electric network, or also fast frequency and amplitude variations, for example, in a phase of intense braking of an electric vehicle. According to an embodiment, period T is in the range from 1 ms to 1 s, which corresponds to a frequency in the range from 1 Hz to 1,000 Hz. As an example, when the switched cell system is used for the control of an electric motor, the voltage and the current to be delivered by the system may be substantially sinusoidal with a period T in the order of from a few milliseconds to a few hundreds of milliseconds, where the phases of motor acceleration/deceleration may be in the order of a few seconds, which only slightly varies the voltage and current curves between one period and the next one. Indeed, for a battery 5 powering an electric motor, according to the motor speed, the electric frequency applied to the motor may range from a few hertz to more than one kilohertz. The analysis time window may for example be selected to be from 100 ms to 1 s to cover at least one full electric period at low speed and a plurality of electric periods when the speed is higher.

Figure 5:
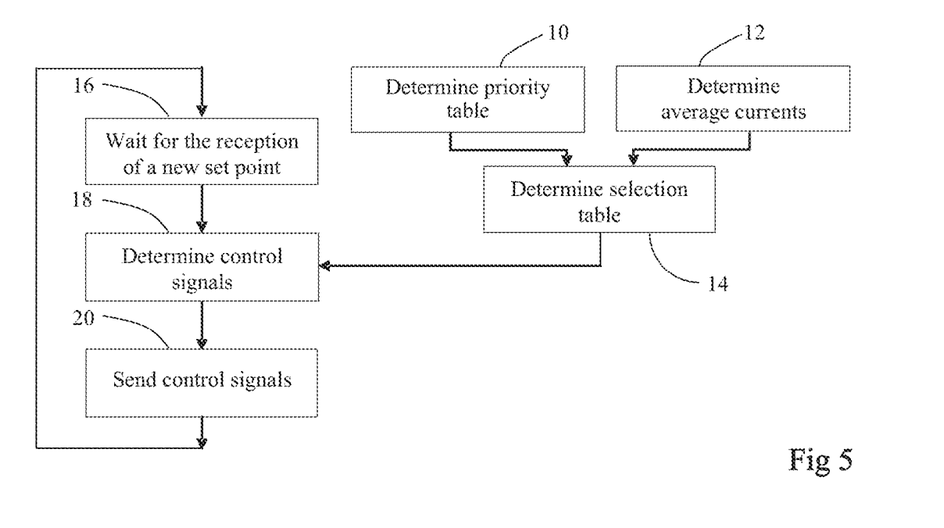
FIG. 5 is a block diagram illustrating an embodiment of a method of controlling a switched cell system.

FIG. 5 is a block diagram illustrating a method of cell connection/disconnection capable of being implemented by a switched cell system, for example, the battery 5 shown in FIG. 3. The method may then be implemented by the master control circuit BMS of battery 5.

At step 10, the priority tables are updated. According to an embodiment, two priority tables are used, the charge priority table and the discharge priority table. As an example, for battery 5, each priority table may be stored in the memory MEM of master control circuit BMS, for example, in the form of a table, each row of the table for example corresponding to a row of memory MEM. As an example, for a system comprising N cells, for each priority table, an identifier, for example, a number which varies from 1 to N, is assigned to each cell. The identifiers associated with the same cell may be the same for the two priority tables. For a system comprising N cells, each priority table comprises N rows, each row j, j being an integer varying from 1 to N, being associated with the cell bearing number j. Master control circuit BMS is particularly adapted to store in each priority table, for each cell, the cell priority level. As an example, for a system comprising N cells, the cell priority levels range from 1 to N, priority level "1" being the highest and priority level "N" being the lowest. The cell priority levels of each priority table may be modified, particularly based on measurements originating from sensors. Call update of the priority table a modification of the priority levels of at least certain cells in the priority table.

The priority levels during a charge operation are not necessarily symmetrical to the priority levels during a discharge operation, that is, the order of the cell priority levels, from the highest priority to the lowest priority, for an operation of discharge of the system, is not necessarily the inverse of the order of the priority levels of the cells, from the highest priority to the lowest priority, for a charge operation.

For the determination of the priority level of each cell of the system in the charge priority table or in the discharge priority table, one or a plurality of criteria may be taken into account among the following criteria, for each cell:
 the state of charge of the cell;
 the cell temperature;
 the cell capacity;
 the state of health (SoH) of the cell;
 the internal impedance of the cell;
 the current which flows through battery 5, for example, the rms current;
 the type of cell, particularly in the case where the cells of the system are not all of the same type with, for example, first cells which are to be preferably used at high temperature and second cells which are to be preferably used at low temperature, or also first cells which are to be preferably used at a low current and second cells which are to be preferably used at high current; and
 an emergency level, particularly for diagnosis needs, for example, to accelerate the charge or the discharge of a specific cell to estimate its state of health (SoH) or conversely to maintain a cell isolated to estimate its off-load voltage after a relaxation time.

At step 12, data representative of the electric charge, of the average current, or of the energy exchanged by the cell corresponding to the implementation number is determined for each implementation number over an analysis time window according to the cell implementation number. In case of a first use, the average current or energy values will be at zero. The analysis time window is defined from period T of the set point C to be followed and is, for example, equal to period T, to half period T, or to a plurality of periods T. Electric period T may be variable, for example, in the case of the driving of a variable-speed motor. In this case, period T will vary over time. It is then possible to use a duration of the average/nominal period, or a duration measured over the previous periods, as a basis, or to select a window of fixed duration determined in advance. According to an embodiment, the period, or a plurality of periods, immediately preceding the time of the analysis, is used. The implementation number corresponds to the rank of the cell in the cell connection succession. A cell having an implementation number n means that the cell is the n-th cell to be connected. When the disconnection rule is the FILO rule, this further means that the cell is the n-th from the last one to be disconnected.

The average current may be determined by calculating the average of the current exchanged by the cell, corresponding to the implementation number n for which the current is desired to be calculated, over the analysis window. The electric charge exchanged with a cell, corresponding to the implementation number n for which the current is desired to be calculated, over the analysis window may be determined by calculating the integral of the current exchanged by the cell over the analysis window. The exchanged energy corresponds to the product of the electric charge exchanged over the analysis window by the voltage across the cell. The average current delivered by a cell may be determined from current measurements originating from a current sensor. As a variant, the average current of a cell may be determined by simulation from the variation of the total current delivered by the system over the analysis window and from the estimated times of connection and disconnection of the cell over the analysis window. In the following description, the average current supplied by cell with implementation n over the analysis window is used. It should however be clear that the embodiments described hereafter also apply in the case where other data representative of the electric charge, of the average current, or of the energy exchanged by the cell over the analysis window are used.

It is further determined whether the average output power of the system is a positive or negative power over the analysis window, that is, whether the system is generally discharging or charging over the analysis window. A classification of the cell implementation numbers according to the average currents of the cells associated with these implementation numbers n is then determined. When the system is generally discharging over the analysis window, the cell implementation numbers may be classified according to the decreasing average currents, including the cell implementation numbers for which the average current is null. When the system is generally charging over the analysis window, the cell implementation numbers may be classified according to the increasing average currents, including the implementation numbers of the cells for which the average current is null over the analysis window.

At step 14, a selection table is determined from the priority table and the classification of the cell implementation numbers. The selection table indicates the next cell to be implemented, that is, to be connected. The selection table may comprise, for each cell, the cell implementation number and the cell identifier. As an example, for a battery comprising N cells, the cell implementation numbers are in the range from 1 to N, implementation number 1 means that the associated cell will be the first one to be connected and implementation number N means that the associated cell will be the last one to be connected.

According to an embodiment, the implementation numbers are assigned to the cells by taking into account the priority tables and the classification of the cell implementation numbers according to the average currents of the cells. According to an embodiment, the charge priority table is used if the system is generally charging and the discharge priority table if the system is generally discharging and the implementation numbers of the classification of the cell implementation numbers, classified at step 12, are assigned to the cells classified according to increasing priority levels. This means that the cell having the $i^{th}$ priority level in the priority table is assigned the implementation number located at the $i^{th}$ position in the implementation number classification. For example, the cell having the highest priority level in the priority table is assigned the implementation number located at the first position in the implementation number classification. Similarly, the cell having the second highest priority level in the priority table is assigned the implementation number which is in the second position in the implementation number classification, and so on.

For certain current and voltage waveforms, first cells may exchange a positive average energy over a period T of variation of the voltage and of the current delivered by the system while second cells may exchange a negative average energy over period T. This means that, over period T, the first cells are generally discharging while the second cells are generally charging. In the previously-described embodiment, if the system is generally charging, the charge priority table is used for all cells for the determination of the selection table, that is, both for cells which are charging over period T and for cells which are discharging over period T. If the system is generally discharging, the charge priority table is used for all cells, that is, both for cells which are discharging over period T and for cells which are charging over period T According to another embodiment, for the determination of the selection table, the charge priority table is used for cells which are generally charging over period T and the discharge priority table is used for cells which are generally discharging over period T. This enables to avoid the risk of overcharging certain cells while the average power supplied by the system is positive, which corresponds to a discharge of the system, and conversely the risk of excessively discharging certain cells while the system is generally recharging.

However, cells may both hold the priority in charge and in discharge and are thus likely to appear twice in the selection table when first cells are generally discharging and second cells are generally charging over period T. To avoid such a conflict, one of the following possibilities may then be implemented:
- first assign the implementation numbers to the cells having an average current of a first sign, for example, the cells which take part in the main charge or discharge mode of the system, and then assign the remaining implementation numbers to the remaining cells;
- in case of conflict, alternate the assignments between the implementation numbers corresponding to positive and negative currents; or
- in case of a conflict, randomly assign the implementation numbers corresponding to positive and negative currents.

At step 16, the system determines whether a new set point C has been received. If a new set point C has been received, the method carries on at step 18.

At step 18, the system determines control signals to follow the new set point by using the selection table. The method carries on at step 20.

At step 20, the cells are connected/disconnected according to the control signals. The method carries on at step 16.

Steps 10 and 12 may be carried out independently from each other and independently from steps 16 to 20. As an example, steps 10 and 12 may be carried out repeatedly, for example, every 100 ms, ideally from one to a few times the analysis window, or from one to a few times electric period T. A new selection table may be determined at step 14 each time an update of the charge or discharge priority table is performed at step 10 and each time a new classification of the implementation numbers is determined at step 12.

As a variant, step 16 may be absent and steps 18 and 20 may be executed at each cycle. When set point C does not vary, the control signals are however determined at step 18 to follow the unchanged value of set point C and the control signals are transmitted to the cells at step 20. Indeed, in certain cases, the set point may remain constant while the selection table changes, in this case, a permutation between a connected cell and a disconnected cell may occur to improve the balancing.

Figure 6:
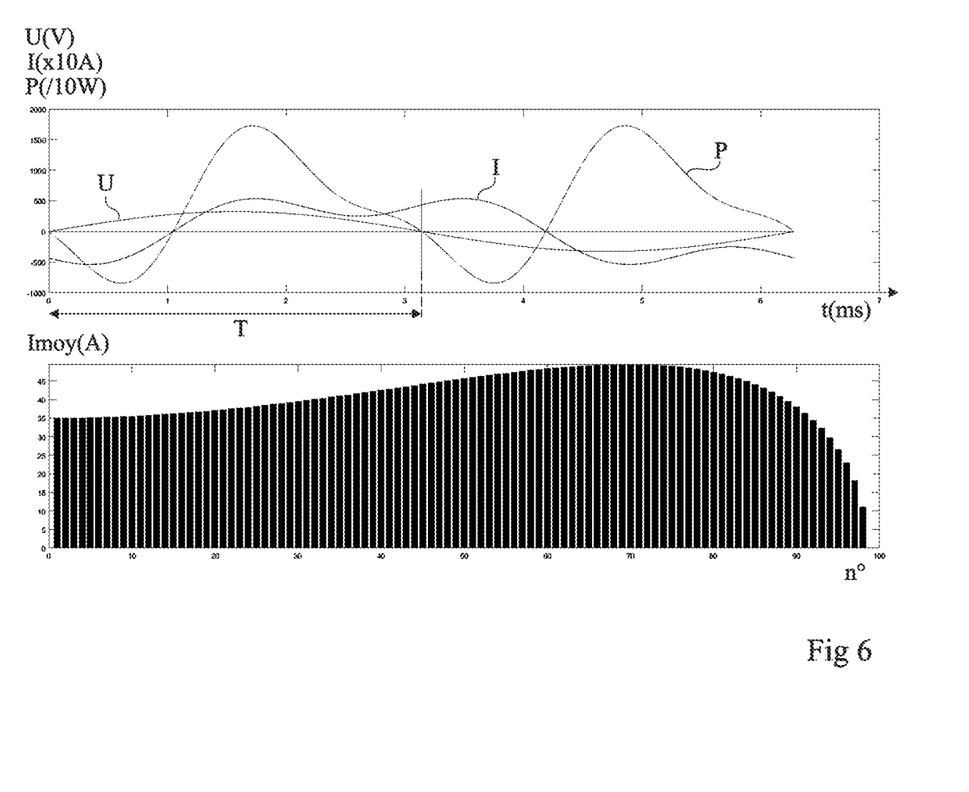
FIGS. 6 to 9 show different examples of curves of variation of the voltage, of the current intensity, and of the instantaneous power to be delivered by the battery shown in FIG. 3 and the distributions of the average currents delivered by the battery cells according to the cell implementation number.

FIG. 6 shows in its upper portion a first example of curves of the variation of the voltage U (expressed in volts), of the current I (expressed in decaamperes), and of the instantaneous power P (expressed in deciwatts) delivered by a battery for a period T having the structure shown in FIGS. 3 and 4 and comprising at least 98 cells each capable of delivering 3.3 V. If other cells are available in the system, these cells will not be used (connected) until a new selection table is defined (at step 14). FIG. 6 showing the distribution of the average currents by implementation number only shown the 98 first implementation numbers. If the system has more than 98 cells, then the next implementation numbers have a null average current since it is not used over the analysis window considered herein.

In the first example, voltage U is sinusoidal and current I is phase-shifted by $\pi/3$ with respect to voltage curve U and contains harmonics, particularly of rank 3. To provide the curve of sinusoidal voltage U, battery 5 connects, at its output, one cell after the other, until the maximum value of the voltage, after which the cells are disconnected to reach a null voltage. In the first example, the insertion or the removal of a cell represents a 3.3-V voltage jump. To generate the negative voltage, the cells are connected at the output with the inverted biasing. The shape of current curve I and its phase shift, as compared with voltage U, induces a sign alternation for instantaneous power P with a positive average power.

FIG. 6 shows in its lower portion the average current Imoy delivered for each cell of the battery ordered from 1 to 98 according to the cell implementation number, the cell having implementation number 1 being the first one to be connected. It should be noted that over an analysis window, the priority table may have changed, as well as the selection table. Thus, a same implementation number may have been occupied by two different cells at two different times of the analysis window. The average current to be considered corresponds to the implementation number and not to a cell which has temporarily taken this implementation number. In the first example, the average current distribution is not monotonous and the cell which exchanges the largest amount of energy is that having implementation number 69 and which is only connected when the voltage U to be delivered is greater than 224.4 V. This means that during the implementation of the method previously described in relation with FIG. 5, at step 14, the cell with the highest priority in discharge is assigned implementation number 69, which has the average current of highest value, and the cell with the lowest priority in discharge is assigned implementation number 98, which has the non-null average current of lowest value in the case where only 98 cells are available. If, for example, there are 99 available cells, the cell with the lowest priority in discharge will not be used and it will have implementation number 99 (with 0 ampere of average current) or any number beyond 98 if there are more than 99 cells.

Figure 7:
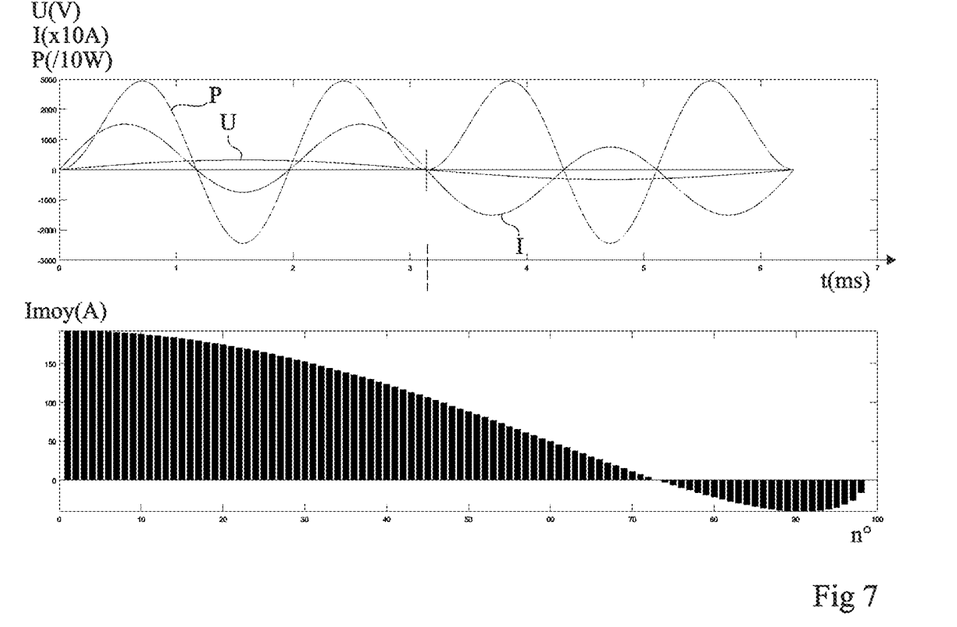

FIG. 7 is a drawing similar to FIG. 6 for a second example of curves of variation of voltage U and of current I. In the second example, voltage U is sinusoidal and current I is in phase with voltage U and contains a strong harmonic component, particularly of rank 3. Further, the battery comprises 98 cells capable of each delivering 3.3 V. As shown in the lower portion of FIG. 7, for cells having an implementation number smaller than or equal to No 72, the average current delivered by the cell is positive and for cells having an implementation number smaller than or equal to No 74, the average current delivered by the cell is negative. This means that cells having an implementation number smaller than or equal to No 72 undergo a discharge while cells having an implementation number smaller than or equal to No 74 undergo a charge. In the second example, the battery is generally discharging, and thus the first 73 implementation numbers are classified by decreasing order of average current Imoy and associated with the 73 cells having the highest discharge priority by increasing order of priority levels. According to an embodiment, the last 26 implementation numbers may be classified by decreasing order of average current Imoy and associated with the 26 cells with the lowest discharge priority by decreasing order of priority levels. As a variant, the last 26 implementation numbers may be classified by increasing order of average current Imoy and associated with the 26 cells with the highest charge priority by decreasing order of priority levels.

Figure 8:
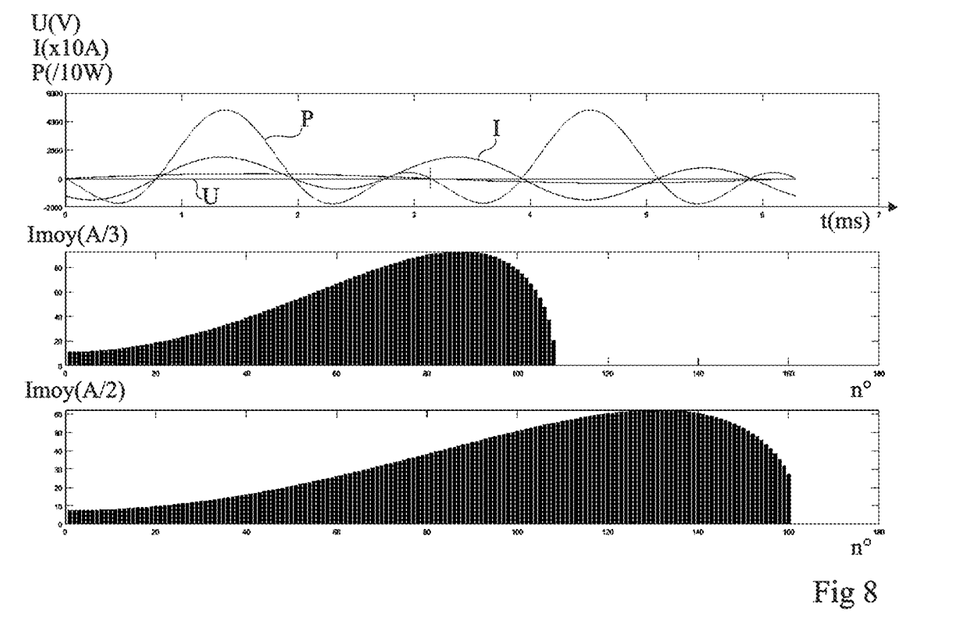

FIG. 8 is a drawing similar to FIG. 6 for a third example of curves of variation of voltage U and of current I. In the third example, voltage U is sinusoidal and current I is phase-shifted with respect to the voltage by π/4 and contains a strong harmonic component, particularly of rank 3. FIG. 8 shows in its central portion and in it lower portion the average current Imoy delivered for each cell of the battery ordered according to the cell implementation number, the cell bearing number 1 being the first one to be connected, when the nominal cell across each cell is equal to 3 V (histogram in the central portion) and when the nominal voltage across each cell is equal to 2 V (histogram in the lower portion).

As shown in FIG. 8, the total number of cells implemented to follow voltage set point U is larger if the cells are charged to 2 V rather than to 3 V.

Figure 9:
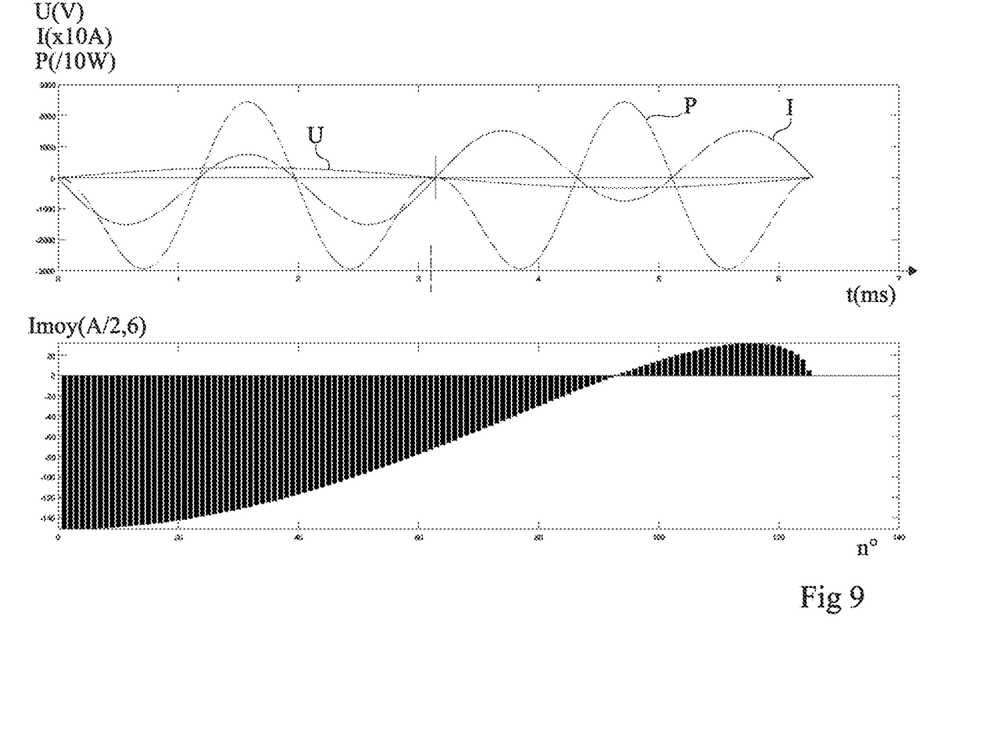

FIG. 9 is a drawing similar to FIG. 6 for a fourth example of curves d' of variation of voltage U and of current I. In the fourth example, voltage U is sinusoidal and current I is in phase with the voltage and contains a strong harmonic component, particularly of rank 3. Further, the battery comprises at least 125 cells capable of each delivering 2.6 V. In the fourth example, the battery is generally charging, since the energy absorbed by the 92 first implemented cells which are in average charging is greater than the energy delivered by the 33 next cells which are in average discharging. In the fourth example, the battery being generally charging, the first 92 implementation numbers are classified by increasing order of average currents (taking the sign into account) and associated with the 92 cells with the highest charge priority, and the last 33 implementation numbers may be classified by increasing order of average currents and associated with the 33 cells with the lowest charge priority. As a variant, the last 33 implementation numbers may be classified by decreasing order of average currents and associated with the 33 cells with the highest discharge priority.

If the battery contains more than 125 cells, for example, 160 cells, the cells ranging from 126 to 160 will not be used in this electric period and particularly until a new selection table is defined (at step 14). The definition of a new selection table, for example triggered by a new priority table determination, for example, after the non-symmetrical discharge of the cells, at step 10, may change the cell priority, and a cell which has not been used over the previous period may be used afterwards, since it may have a higher priority in the new selection table.

The real current distribution by implementation number generally does not exactly correspond to the ideal current distribution that there should be per cell to ensure a perfect balancing (particularly a current proportional to the remaining charge or discharge capacity). In practice, so that each cell ends up seeing an optimal relative average current, the cells regularly change priority and thus eventually implementation number to converge over a large duration, typically from 10 to 100 times greater than the analysis window, towards a relative average current value close to the ideal value. Typically, unless there is a defective cell, there is no reason for a cell which is not implemented over an electric period not to be implemented over another electric period.

In the previously-described embodiments, the disconnection rule according to which the first cell to be connected is the last cell to be disconnected, this rule being called FILO (First In Last Out) rule hereafter, has been used. However, another disconnection rule may be used. As an example, the connection rule may be that the first connected cell is the first one to be disconnected, this rule being called FIFO (First In First Out) rule hereafter.

Figure 10:
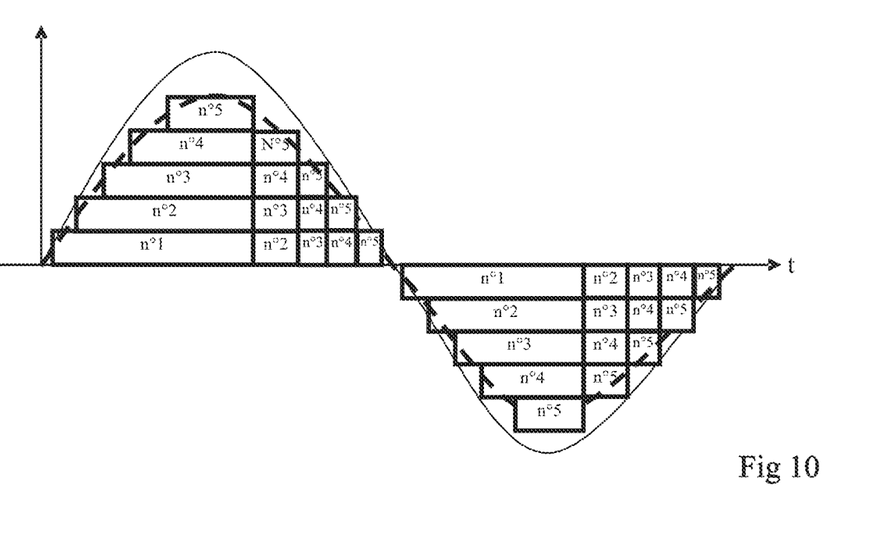
FIG. 10 is a view similar to FIG. 1 for another cell connection rule.

FIG. 10 is a drawing similar to FIG. 1 in the case of a use of the FIFO disconnection rule. The cells being disconnected according to a different order in FIG. 10 than in FIG. 1, they thus see a different average current, which modifies the distribution of the average currents according to the implementation numbers.

Figure 11:
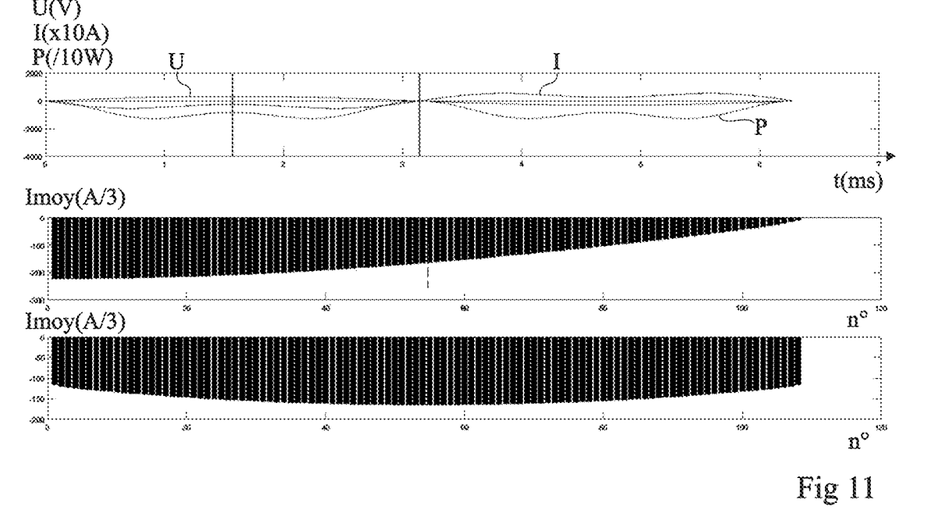
FIGS. 11 to 13 show different examples of curves of variation of the voltage, of the current intensity, and of the instantaneous power to be delivered by the battery shown in FIG. 2 and the distributions of the average currents delivered by the battery cells according to the cell implementation number for two different cell connection rules.

FIG. 11 is a drawing similar to FIG. 6 for a fifth example of curves of variation of voltage U and of current I. In the fifth example, voltage U is sinusoidal and current I is phase-shifted with respect to the voltage by 7C and contains a strong harmonic component, particularly of rank 3. Further, the battery comprises at least 108 cells capable of each delivering 3 V. FIG. 11 shows in its central portion and in it lower portion the average current Imoy delivered for each cell of the battery ordered from 1 to 108 according to the cell implementation number, the cell bearing number 1 being the first one to be connected, when the FILO connection rule is implemented (histogram in the central portion) and when the FIFO connection rule is implemented (histogram in the lower portion).

According to an embodiment, on implementation of the method previously described in relation with FIG. 5, at step 12, the average current distribution when a first disconnection rule is used, for example, the FILO rule, and a first classification of the implementation numbers is performed, is determined. The average current distribution is further determined when a second disconnection rule is used, for example, the FIFO rule, and a second classification of the implementation numbers is performed. At step 14, a comparison criterion is then used to select the first classification or the second classification which will be used to determine the selection table. As an example, the ideal currents per cell enabling to reach or to maintain the cell balance may be estimated, and the cells may be sorted according to this criterion, for example, by increasing value of the ideal currents, to obtain a third classification. The third classification may then be compared with the first classification and with the second classification and the classification which is selected among the first classification or the second classification may be that which is "closest" to the third classification. As an example, the current values of the first, second, and third classifications may be normalized, for example, so that the average value of the current of each classification is equal to one. For each position, the ideal current value, possibly normalized, may be compared with the current values, possibly normalized, of the first classification and of the second classification. The classification selected among the first classification or the second classification may be that for which the intervals between the ideal current values and the current values of the first or second classifications are the smallest, while enabling to reach the cell balance or, short of this, to come as close as possible thereto.

Figure 12:
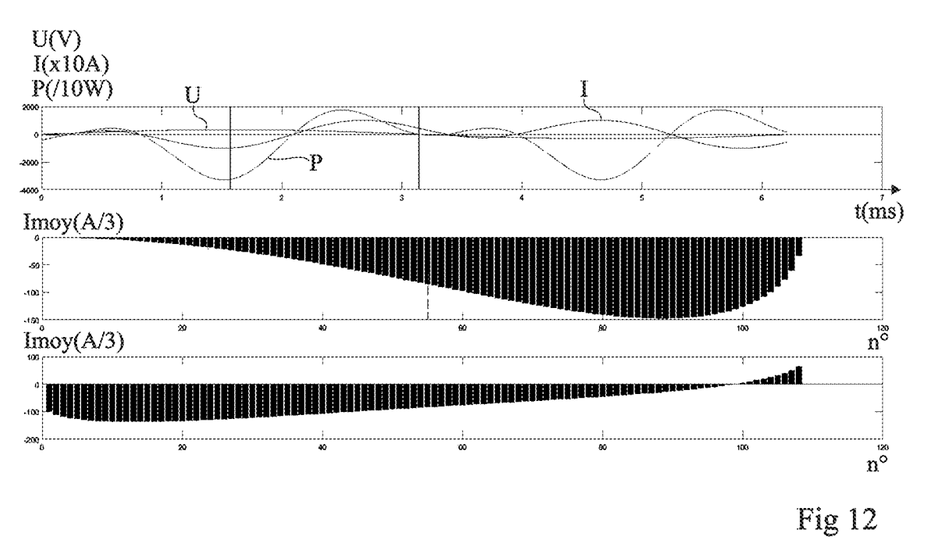

FIG. 12 is a drawing similar to FIG. 11 for a sixth example of curves of the variation of voltage U and of current I. In the sixth example, voltage U is sinusoidal and current I is phase-shifted by $2\pi/3$ with respect to voltage U and contains a strong harmonic component, particularly of rank 3. Further, the battery comprises at least 108 cells capable of each delivering 3 V. The distribution of average currents Imoy when the FILO disconnection rule is implemented (histogram in the central portion) is very different from the distribution of average currents Imoy when the FIFO disconnection rule is implemented (histogram in the lower portion).

Figure 13:
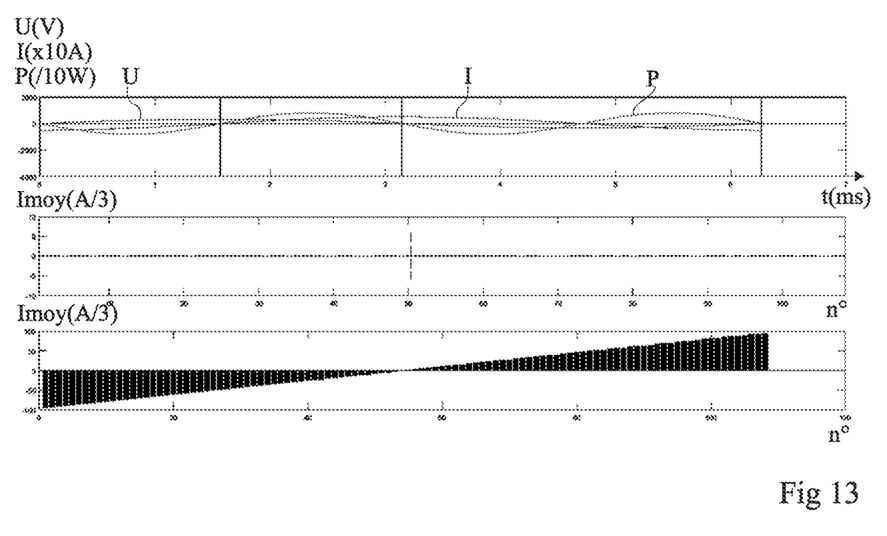

FIG. 13 is a drawing similar to FIG. 11 for a seventh example of curves of the variation of voltage U and of current I. In the seventh example, voltage U is sinusoidal and current I is phase-shifted by $\pi/2$ with respect to the voltage. Further, the battery comprises at least 108 cells capable of each delivering 3 V. When the FILO disconnection rule is implemented (histogram in its central portion), each cell undergoes a small charge or a small discharge, at each period, so that the average current exchanged by the cell is null at the end of each period. When the FIFO connection rule is implemented (histogram in its lower portion), half of the cells see a positive (discharge) average current and the other half see a negative (charge) average current.

Specific embodiments of the present invention have been described. Various alterations and modifications will occur to those skilled in the art. Although FIG. 3 shows an embodiment of arrangement of the cells and of the switches of a module $E_1$, it should be clear that the structure of each module $E_1$ may be different. In particular, the structure of each module $E_1$ may correspond to one of the structures described in patent applications WO 2012/117110, US2014287278, FR2972308, FR2972307, and US2014109950.

It should be noted that a cell may be an assembly of elementary cells placed in series and/or in parallel. If it is an assembly of elementary cells, a secondary management circuit may be used for example to measure voltages/temperatures of elementary cells or also to ensure their balancing. This assembly of elementary cells forms a cell which has a given general state, for example, a state of charge, a temperature having a value that can be deduced from the states of the elementary cells forming the cell. The invention further aims at managing the relative average current crossing each cell.

It should be noted that in the previously-described examples, balancing cases have been disclosed mainly in view of the differences in the cell characteristics and of the current/voltage profiles to be output. In practice, secondary electric loads may be connected to certain cells or to the terminals of certain groups of cells. In this case, the balancing according to the invention has not only the function of compensating for the capacity imbalances of the cells, but also that of compensating for imbalances induced by the different leakage currents linked to the secondary loads. Typically, certain cells may power the drive electronics, the measurement electronics, other may power the auxiliary network of a vehicle, for example, or also other may power different accessories under different voltages. The secondary loads are not concerned with maintaining the cells balanced with respect to one another, the cells should then be balanced via the principle of the invention during the power supply of the main load or during the recharge.

A specific case corresponds to a device formed of modules placed in series, each of the modules enabling to switch cells in series/parallel, as described in patent US20142872780. Each of the modules for example enables to manage 4 cells, the 4 cells being separated into two bricks of 2 cells, where the two bricks may be in series or parallel and the cells inside of the two bricks may themselves be placed in series/parallel, where each of the cells may further be totally disconnected. Call I the main current at the output of the battery pack, then each cell sees a current substantially of I, I/2, I/3, I/4 or null according to whether they are respectively fully in series, in parallel by 2, in parallel by 3, in parallel by 4, or disconnected. To pass from a null voltage to a high voltage, the modules are for example first bypassed (state 0) and then progressively implemented with their 4 cells in parallel (state 1), and then, progressively the modules have in parallel 2 times 2 cells in series (state 2), and then two cells in series in series with two cells in parallel (state 3), and finally the 4 cells in series (state 4). For the implementation number, it can for example be considered that number 1 corresponds to the cell which is always submitted first to a higher ratio of current I. In other words:

the first module which switches from state 0 to state 1 contains the cell with implementation number 1, the module m which switches from state 0 to state 1 contains the implementation cell having the lowest implementation number among the modules which have not switched from state 0 to state 1 yet.

Then, the first module which passes from state 1 to state 2 is that which contains the cell with implementation number 1. The module m which passes from state 1 to state 2 contains the cell with the implementation having the lowest implementation number among the modules which have not passed from state 1 to state 2 yet.

Then, the first brick inside of the modules which has its two cells in series and in series with the other brick of the module is that which contains the cell with implementation number 1. The brick b which places its two cells in series and in series with other brick contains the cell with an implementation having the lowest implementation number among the bricks which have not made the change yet. It should be noted that the bricks which have not made the change have either their 2 cells in parallel, or possibly their 2 cells in series if the other brick of the module has not changed yet and is placed in parallel with, for it also, its cells in series.

This corresponds to a nominal operation. If a cell appears to be defective, the latter should always be discarded from the operation and the neighboring cell(s) cannot be placed in parallel therewith, which will necessary modify the operation with respect to this nominal case. Further, to reinforce the balancing, the cells with the lowest priority may be fully discarded from the operation until they are strictly useful for the voltage delivery, or rather implemented according to the invention as in the case already disclosed to the device described in relation with FIGS. 3 and 4.

The invention claimed is:

1. A method of controlling an electric system comprising first and second terminals, electric cells, and switches configured to connect or disconnect the cells in series and/or in parallel between the first and second terminals, the method comprising the steps of:
   a) determining a first priority table comprising first cell priority levels for a system charge operation and a second priority table comprising second cell priority levels for a system discharge operation;
   b) determining data representative of the average current or of the average electric power exchanged by each cell over a time window according to the cell implementation number in a cell connection sequence;
   c) determining a classification of at least part of the cell implementation numbers by increasing or decreasing order of the data representative of the average current or of the average electric power;
   d) assigning the implementation numbers according to the classification order to the cells by increasing or decreasing order of the priority levels of at least one of the first or second priority tables; and
   e) controlling the switches to connect or disconnect the cells according to the order of the assigned implementation numbers.

2. The control method according to claim 1, further comprising, at step e), the reception by the system of a new set point and the control of the switches to connect the cells according to the order of the assigned implementation numbers.

3. The control method according to claim 1, wherein at step c), all the cell implementation numbers are classified by increasing or decreasing order of the data and wherein, at step d), all the implementation numbers are assigned to the cells by increasing or decreasing order of the priority levels of one of the first or second priority tables.

4. The control method of claim 1, wherein the data may have a first sign or a second sign opposite to the first sign, the method comprising, at step c), determining a first classification of the cell implementation numbers by increasing or decreasing order of the data of the first sign and determining a second classification of the cell implementation numbers by increasing or decreasing order of the data of the second sign, the method further comprising, at step d), assigning the implementation numbers according to the order of the first classification to the cells by increasing or decreasing order of the priority levels of the first priority table and assigning the implementation numbers according to the order of the second classification to the cells by increasing or decreasing order of the priority levels of the second priority table.

5. The control method according to claim 1, wherein the cells are disconnected according to one of at least two disconnection rules, wherein steps b) and c) are carried out for each disconnection rule, the method comprising, for the implementation of step d), selecting a first classification obtained with the first disconnection rule or a second classification obtained with the second disconnection rule according to the comparison of the data of the first and second classifications with desired data.

6. The control method according to claim 5, wherein the first disconnection rule is that the first cell to be connected is the last cell to be disconnected and wherein the second disconnection rule is that the first cell to be connected is the first cell to be disconnected.

7. The control method according to claim 1, wherein the time window is shorter than 500 ms.

8. The control method according to claim 2, wherein the set point is selected from the group comprising a set point for the delivery of a voltage between the first and second terminals, a set point for the delivery of a current to the first terminal, or a set point for the number of electric cells.

9. The control method according to claim 1, wherein the first priority table is used during the absorption by the system of electric energy originating from the outside and wherein the second priority table is used during the delivery of electric energy by the system to the outside.

10. The control method according to claim 9, comprising passing from the use of the first priority table to the second priority table when the system passes from the absorption of electric energy originating from the outside to the delivery of electric energy to the outside and passing from the use of the second priority table to the first priority table when the system passes from the delivery of electric energy to the outside to the absorption of electric energy originating from the outside.

11. An electric system comprising first and second terminals, electric cells, switches configured to connect or disconnect the cells in series and/or in parallel between the first and second terminals, and a processing module configured to:
   a) determine a first priority table comprising first cell priority levels for a system charge operation and a second priority table comprising second cell priority levels for a system discharge operation;
   b) determine data representative of the average current or of the average electric power exchanged by each cell over a time window according to the cell implementation number in a cell connection sequence;
   c) classify at least part of the cell implementation numbers by increasing or decreasing order of the data representative of the average current or of the average electric power;
   d) assign implementation numbers according to the classification order to the cells by increasing or decreasing order of the priority levels of at least one of the priority tables; and
   e) control the switches to connect or disconnect the cells according to the order of the assigned implementation numbers.

12. The electric system according to claim 11, wherein the cells are electric charge storage elements and/or electric generators.

13. The electric system according to claim 12, wherein the cells are electric accumulators.

14. The control method according to claim 1, wherein an order of the second cell priority levels for the system discharge operation is different from an order of the first cell priority levels for the system charge operation.

15. The electric system according to claim 11, wherein an order of the second cell priority levels for the system discharge operation is different from an order of the first cell priority levels for the system charge operation.

* * * * *